(12) United States Patent
Kuta et al.

(10) Patent No.: US 11,762,998 B2
(45) Date of Patent: Sep. 19, 2023

(54) SYSTEM AND METHOD FOR PROTECTION AND DETECTION OF ADVERSARIAL ATTACKS AGAINST A CLASSIFIER

(71) Applicant: DE-IDENTIFICATION LTD., Tel Aviv (IL)

(72) Inventors: Eliran Kuta, Tel Aviv (IL); Sella Blondheim, Tel Aviv (IL); Gil Perry, Tel Aviv (IL); Yoav Hacohen, Jerusalem (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 316 days.

(21) Appl. No.: 17/063,725

(22) Filed: Oct. 6, 2020

(65) Prior Publication Data

US 2021/0125005 A1 Apr. 29, 2021

(30) Foreign Application Priority Data

Oct. 23, 2019 (IL) .......................................... 270116

(51) Int. Cl.
*G06F 21/56* (2013.01)
*G06N 3/082* (2023.01)
(Continued)

(52) U.S. Cl.
CPC ........ *G06F 21/566* (2013.01); *G06F 18/2148* (2023.01); *G06F 18/2185* (2023.01); *G06F 21/645* (2013.01); *G06N 3/082* (2013.01)

(58) Field of Classification Search
CPC .. G06K 9/6264; G06K 9/6257; G06K 9/6231; G06F 21/645; G06F 18/2148;
(Continued)

(56) References Cited

U.S. PATENT DOCUMENTS

| 6,278,791 B1 | 8/2001 | Honsinger et al. |
| 8,270,718 B2 | 9/2012 | Drory et al. |

(Continued)

FOREIGN PATENT DOCUMENTS

| EP | 3451209 | 3/2019 |
| KR | 102123248 | 6/2020 |

(Continued)

OTHER PUBLICATIONS

Liang Du et al. "GARP-Face: Balancing Privacy Protection and Utility Preservation in Face De-identification" IEEE International Joint Conference on Biometrics, Clearwater, FL, 2014, pp. 1-8.

(Continued)

*Primary Examiner* — Daniel B Potratz
(74) *Attorney, Agent, or Firm* — PEARL COHEN ZEDEK LATZER BARATZ LLP

(57) ABSTRACT

A system and a method of prevention and/or detection of adversarial attacks against a classifier may include for example: using a classifier adapted to classify data elements of a specific category; receiving a first data element; applying the classifier on the first data element, to produce a first classification of the data element; using an autoencoder to generate a reconstructed, second data element based on the first data element; applying the classifier on the second data element, to produce a second classification of the data element; and analyzing the first and second classifications to detect and/or prevent an adversarial attack on the classifier.

11 Claims, 7 Drawing Sheets

---

1005: Using a classifier, adapted to classify data elements of a specific category.

1010: Receiving a first data element.

1015: Applying the classifier on the first data element, to produce a first classification of the data element.

1020: Using an autoencoder to generate a reconstructed, second data element based on the first data element.

1025: Applying the classifier on the second data element, to produce a second classification of the data element.

1030: Analyzing the first and second classifications to detect an adversarial attack on the classifier.

(51) Int. Cl.
   *G06F 18/21* (2023.01)
   *G06F 21/64* (2013.01)
   *G06F 18/214* (2023.01)

(58) Field of Classification Search
   CPC .... G06F 18/2185; G06N 3/082; G06N 3/084; G06V 10/7788; G06V 30/19167; G06V 10/7747; G06V 30/19147
   See application file for complete search history.

(56) References Cited

U.S. PATENT DOCUMENTS

| | | | |
|---|---|---|---|
| 9,105,119 | B2 | 8/2015 | Whitehill et al. |
| 2007/0236513 | A1 | 10/2007 | Hedenstroem et al. |
| 2010/0074525 | A1 | 3/2010 | Drory et al. |
| 2011/0123118 | A1 | 5/2011 | Nayar et al. |
| 2012/0177248 | A1 | 7/2012 | Shuster |
| 2012/0288166 | A1 | 11/2012 | Sun et al. |
| 2014/0328547 | A1 | 11/2014 | Whitehill et al. |
| 2015/0261995 | A1 | 9/2015 | Hudgins |
| 2015/0324633 | A1 | 11/2015 | Whitehill et al. |
| 2017/0111515 | A1* | 4/2017 | Bandyopadhyay ... H04M 15/41 |
| 2017/0301121 | A1 | 10/2017 | Whitehill et al. |
| 2017/0302661 | A1 | 10/2017 | Conell, II et al. |
| 2019/0188562 | A1 | 6/2019 | Edwards et al. |
| 2019/0238568 | A1* | 8/2019 | Goswami ............... G06N 3/045 |
| 2019/0266483 | A1* | 8/2019 | Ozertem ................ G06N 7/01 |
| 2019/0332850 | A1 | 10/2019 | Sharma et al. |
| 2020/0050945 | A1* | 2/2020 | Chen ..................... G06F 18/214 |
| 2020/0097767 | A1 | 3/2020 | Perry et al. |
| 2020/0143240 | A1* | 5/2020 | Baker .................... G06N 3/045 |
| 2020/0145661 | A1* | 5/2020 | Jeon ..................... H04N 19/136 |
| 2020/0211694 | A1* | 7/2020 | Nye ...................... G06T 7/0016 |
| 2020/0302524 | A1* | 9/2020 | Kamkar ................ G06N 20/20 |
| 2021/0049505 | A1* | 2/2021 | Wang .................... G06N 20/00 |
| 2021/0081718 | A1* | 3/2021 | Angel ................... G06F 18/24 |
| 2021/0089879 | A1* | 3/2021 | Shukla ................. G06T 3/40 |
| 2021/0097176 | A1* | 4/2021 | Mathews ............... G06N 5/01 |
| 2022/0124154 | A1* | 4/2022 | Zou ...................... H04L 67/12 |

FOREIGN PATENT DOCUMENTS

| | | | |
|---|---|---|---|
| MX | 2014015326 | 3/2018 | |
| WO | WO 2015/039084 | 3/2015 | |
| WO | WO 2015/039086 | 3/2015 | |
| WO | WO 2016/107651 | 7/2016 | |
| WO | WO 2018/225061 | 12/2018 | |
| WO | WO-2018231708 A2 * | 12/2018 | ............... G06N 3/04 |
| WO | WO 2019/014487 | 1/2019 | |
| WO | WO-2019067960 A1 * | 4/2019 | ........... G06K 9/6267 |

OTHER PUBLICATIONS

Driessen et al. "Achieving Anonymity Against Major Face Recognition Algorithms" In: De Decker B., Dittmann J., Kraetzer C., Vielhauer C. (eds) Communications and Multimedia Security. CMS 2013. Lecture Notes in Computer Science, vol. 8099. pp. 18-33, Springer, Berlin, Heidelberg.

Jourabloo et al. "Attribute Preserved Face De-identification" 2015 International Conference on Biometrics (ICB), Phuket, 2015, pp. 278-285.

Meng et al. "Face De-identification for Privacy Protection" 2014 37th International Convention on Information and Communication Technology, Electronics and Microelectronics (MIPRO), Opatija, 2014, pp. 1234-1239.

Gross et al. "Face De-Identification" In: Senior A. (eds) Protecting Privacy in Video Surveillance, pp. 129-146, Springer, London.

Bitouk et el. "Face Swapping: Automatically Replacing Faces in Photographs" ACM Trans. Graph. 27, 3, Aug. 2008, pp. 1-8.

Muraki et al. "Anonymizing Face Images by Using Similarity-Based Metric" 2013 International Conference on Availability, Reliability and Security, Regensburg, 2013, pp. 517-524.

Chi et al. "Facial Image De-Identification using Identity Subspace Decomposition" 2014 IEEE International Conference on Acoustics, Speech and Signal Processing (ICASSP), Florence, 2014, pp. 524-528.

Gross, Ralph, et al. "Multi-pie." Image and Vision Computing 28.5 (2010): 807-813.

Yang, Shuo, et al. "Wider face: A face detection benchmark." Proceedings of the IEEE conference on computer vision and pattern recognition. 2016.

Kingma, Diederik P., and Jimmy Lei Ba. "Adam: A Method for Stochastic Optimization." (2015). ICLR 2015.

Akhtar, Naveed, and Ajmal Mian. "Threat of adversarial attacks on deep learning in computer vision: A survey." IEEE Access 6 (2018): 14410-14430.

Carlini, Nicholas, and David Wagner. "Towards evaluating the robustness of neural networks." 2017 IEEE Symposium on Security and Privacy (SP). IEEE, 2017.

Baluja, Shumeet, and Ian Fischer. "Adversarial transformation networks: Learning to generate adversarial examples." arXiv preprint arXiv:1703.09387 (2017).

Das, Nilaksh, et al. "Keeping the bad guys out: Protecting and vaccinating deep learning with jpeg compression." arXiv preprint arXiv:1705.02900 (2017).

Le, Vuong, et al. "Interactive facial feature localization." European conference on computer vision. Springer, Berlin, Heidelberg, 2012.

Messer, Kieron, et al. "XM2VTSDB: The extended M2VTS database." Second international conference on audio and videobased biometric person authentication. vol. 964.1999.

Phillips, P. Jonathon, et al. "Overview of the face recognition grand challenge." 2005 IEEE computer society conference on computer vision and pattern recognition (CVPR'05). vol. 1. IEEE, 2005.

Dziugaite, Gintare Karolina, Zoubin Ghahramani, and Daniel M. Roy. "A study of the effect of jpg compression on adversarial images." arXiv preprint arXiv:1608.00853 (2016).

Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.

Schmidhuber, Jurgen. "Deep Learning in Neural Networks: An Overview." arXiv preprint arXiv: 1404.7828 (2014).

Girshick, Ross. "Fast r-cnn." Proceedings of the IEEE international conference on computer vision. 2015.

Girshick, Ross, et al. "Rich feature hierarchies for accurate object detection and semantic segmentation." Proceedings of the IEEE conference on computer vision and pattern recognition. 2014.

Deng, Jia, et al. "Imagenet: A large-scale hierarchical image database." 2009 IEEE Conference on Computer Vision and Pattern Recognition, Miami, FL, 2009, pp. 248-255.

Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.

Xie, Cihang, et al. "Adversarial examples for semantic segmentation and object detection." Proceedings of the IEEE International Conference on Computer Vision. 2017.

Olah, Chris, et al. "The building blocks of interpretability." Distill 3.3 (2018): e10.

Szegedy, Christian, et al. "Intriguing properties of neural networks." arXiv preprint arXiv:1312.6199 (2013).

Papernot, Nicolas, et al. "Practical black-box attacks against machine learning." Proceedings of the 2017 ACM on Asia Conference on Computer and Communications Security. ACM, 2017.

Papernot, Nicolas, et al. "The limitations of deep learning in adversarial settings." 2016 IEEE European Symposium on Security and Privacy (EuroS&P). IEEE, 2016.

Csaji, Balazs Csanad. "Approximation with artificial neural networks." Faculty of Sciences, Etvs Lornd University, Hungary 24 (2001): 48.

Belhumeur, Peter N., et al. "Localizing parts of faces using a consensus of exemplars." IEEE transactions on pattern analysis and machine intelligence 35.12 (2013): 2930-2940.

(56) References Cited

OTHER PUBLICATIONS

Ramanan, Deva, and Xiangxin Zhu. "Face detection, pose estimation, and landmark localization in the wild." 2012 IEEE conference on computer vision and pattern recognition. IEEE, 2012.
Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).
Perez et al. "Face recognition and De-Identification in the frequency domain", Dec. 31, 2016.
Sendik "What's in a face? Metric learning for face characterization" Computer Graphics Forum, 2019.
He et al. "AttGAN: Facial Attribute Editing By Only Changing What You Want" Jul. 25, 2018.
Chi Hehua et al. "Face de identification using facial identity preserving features" Dec. 14, 2015.
International Search Report for App. No. PCT/IL2020/050907 dated Nov. 30, 2020.
International Search Report for App. No. PCT/IL2019/050993 dated Dec. 31, 2019.
European Search Report for App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005;17(2):232-43. Newton et al., Jan. 10, 2005.
European Search Report for Application No. EP20202094.7 dated Mar. 22, 2021.
Search Report for Application No. PCT/IL2020/051287 dated Mar. 25, 2021.
Search Report for Application No. PCT/IL2020/051291 dated Jan. 25, 2021.
Ren, Zhongzheng; Lee, Yong Jae; Ryoo. Learning to Anonymize Faces for Privacy Preserving Action Detection. Eprint arXiv:1803.11556, Jul. 26, 2018.
Letournel, Geoffrey; Bugeau, Aur?Lie; Ta, Vinh-Thong; Domenger, Jean-Philippe. Face De-identification with Expressions Preservations. International Conference on Image Processing (ICIP) 2015, Sep. 2015.
PCT Search Report for Application No. PCT/IL2020/051286, dated Mar. 18, 2021.
Justus Thies et al. "Face2Face: Real-time Face Capture and Reenactment of RGB Videos" CVPR2016, Jul. 29, 2020.
Naruniec et al. "High-Resolution Neural Face Swapping for Visual Effects" vol. 39 No. 4 (2020).
Hyeongwoo Kim et al. "Deep Video Portraits" ACM Transactions on Graphics (TOG) vol. 37, No. 4, May 29, 2018.
Thies et al. "Deferred Neural Rendering: Image Synthesis using Neural Textur" Apr. 28, 2019.
Thies et al. "Neural Voice Puppetry: Audio-driven Facial Reenactment" arXiv preprint arXiv:1912.05566 Dec. 11, 2019.
Fried et al. "Text-based editing of talking-head video" ACM Transactions on Graphics vol. 38 Issue 4 Article No. 68, pp. 1-14, Jul. 4, 2019.

* cited by examiner

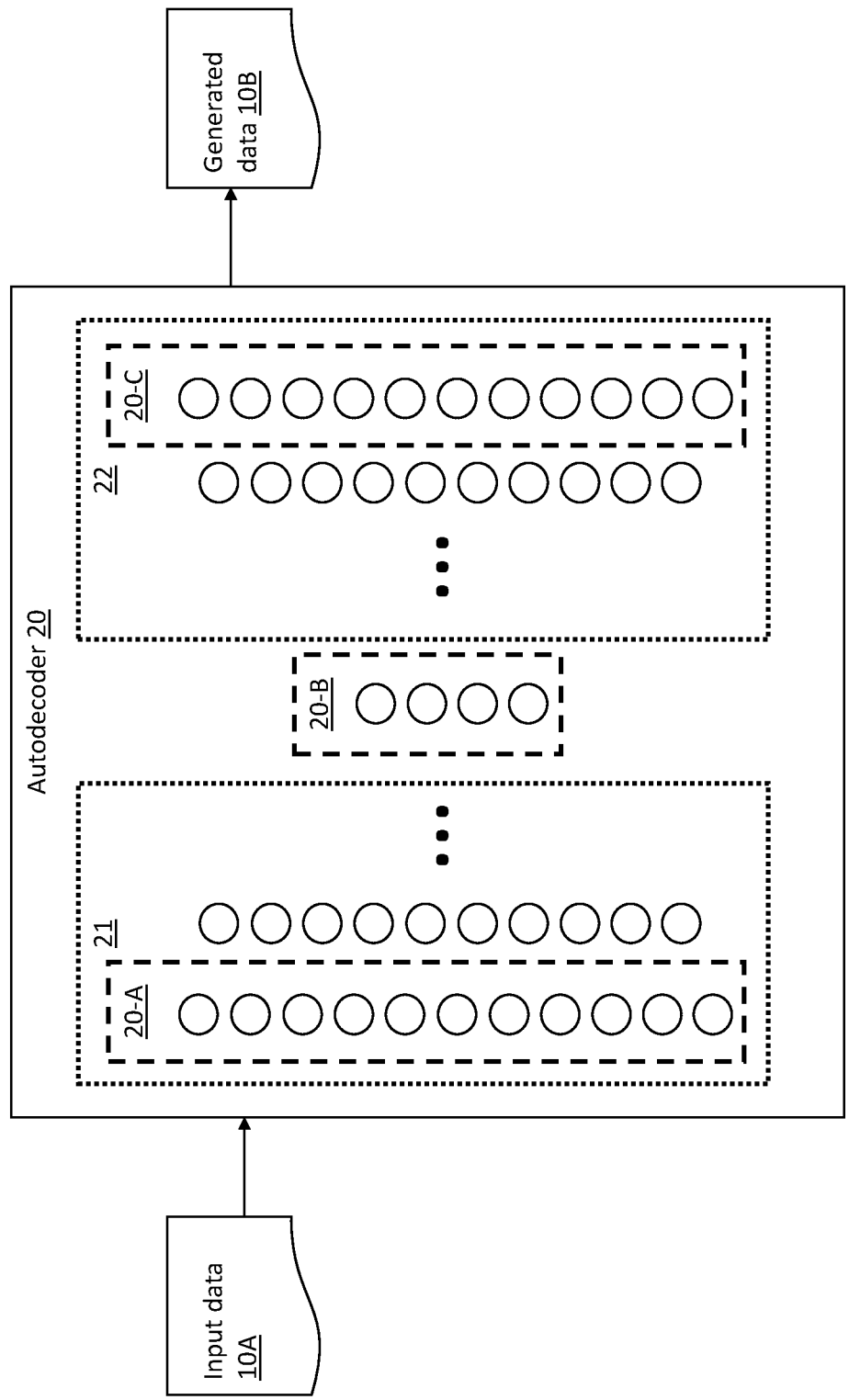

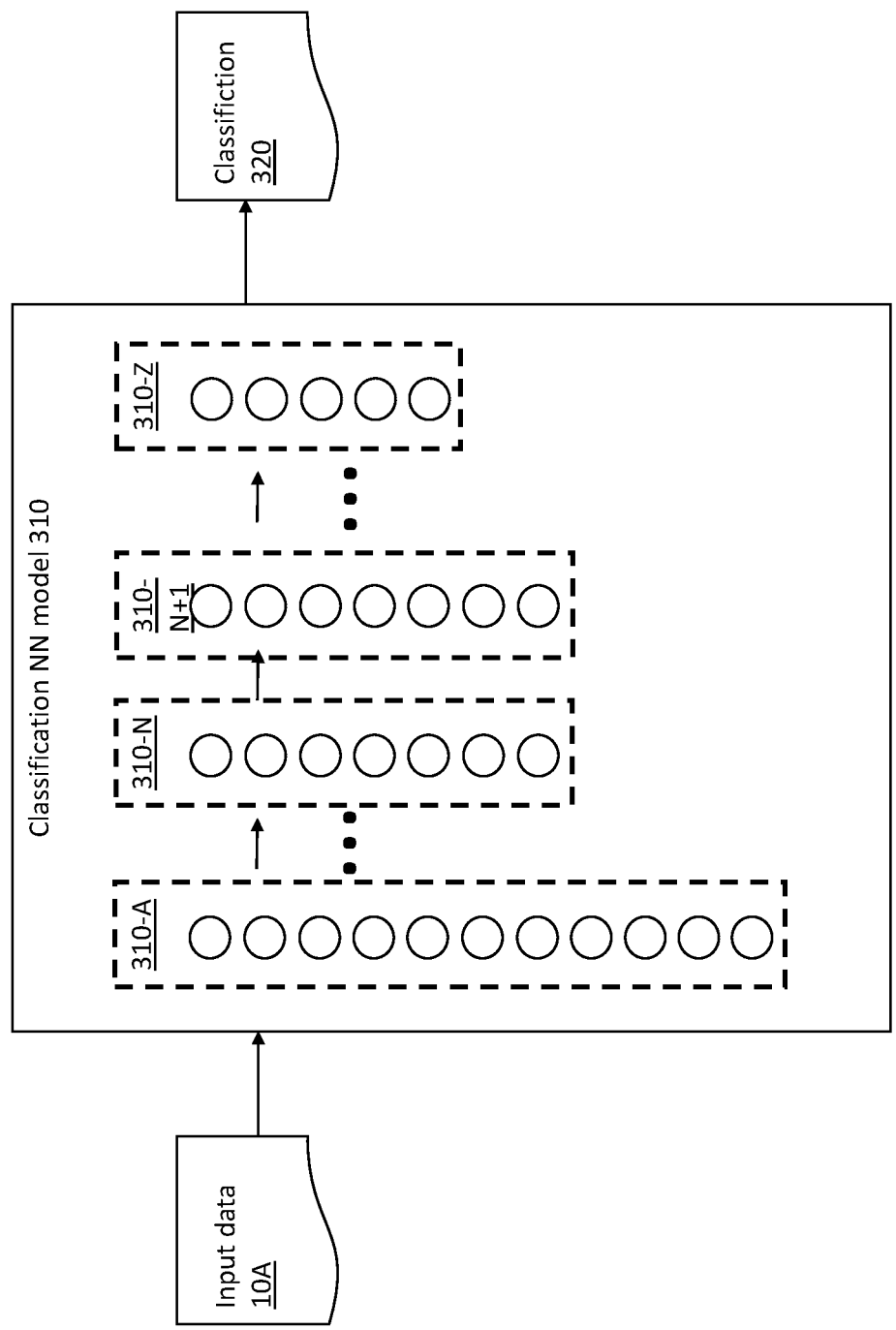

SYSTEM AND METHOD FOR PROTECTION AND DETECTION OF ADVERSARIAL ATTACKS AGAINST A CLASSIFIER

CROSS-REFERENCE TO RELATED APPLICATIONS

This application claims the priority from Israeli Patent Application No. 270116, filed Oct. 23, 2019, and entitled "SYSTEM AND METHOD FOR PROTECTION AND DETECTION OF ADVERSARIAL ATTACKS AGAINST A CLASSIFIER", which is hereby incorporated by reference.

FIELD OF THE INVENTION

The present invention relates generally to data classifiers. More specifically, the present invention relates to detection of adversarial attacks against a data classifier.

BACKGROUND OF THE INVENTION

Computerized data classifiers are computer-executed entities that may be adapted to identify, categorize and/or analyze real-world information. These entities may be implemented by software, hardware or any combination thereof, and are gradually being deployed on an ever-growing variety of applications. For example, classifiers may be used for identifying real-world objects on a sensor (e.g., a camera of an autonomous vehicle providing input images which are classified based on the content of the images), for authenticating (e.g., by voice recognition) an identity of a human user, and the like.

State of the art classifiers may include or may be implemented as a Machine Learning (ML) based classification model, that may be trained to classify and/or identify data elements of a specific category. Pertaining to the same examples, a first classification model may be trained to classify road signs that may appear on a given image, and identify specific types of road signs (e.g., a stop sign, a no-entry sign, etc.). A second classification model may be trained to identify human users according to their voice, which may be included in an audio file and/or audio stream.

Being located at the interface between real-world data and background processing, classification models have recently become susceptible to a new type of attacks, commonly referred to in the art as adversarial attacks, aimed at obfuscating the attacked classifier into producing an erroneous classification or identification of the real-world information. Pertaining to the same examples, an adversarial attack on an audio recording of a first human user's voice may result in obfuscating the classifier into associating the recorded voice with an identity of a second human user.

Adversarial attacks are normally performed by presenting, by an attacker (e.g., a user seeking to obfuscate the classifier) an adversarial example to the attacked classifier. An adversarial example may be a data element (e.g., an image) that has undergone a small change or perturbation, for which the outputs of a classifier (e.g., an ML-based classification model) may be substantially altered in relation to outputs in response to an unaltered data element.

The change or perturbation of data may be small in a sense that the attacker may typically introduce minimal changes or perturbations to the original data in order to achieve the required obfuscation, while keeping the alteration unnoticeable (e.g., by a human observer). Pertaining to the example of identification through voice recognition, an attacker may want to change a voice sample, belonging to the first user so as to 'fool' a classifier into identifying the voice as belonging to the second user, while avoiding a condition in which a human listener may identify the altered voice sample as altered, or as not belonging to the first user.

State of the art solutions for identifying adversarial attacks may include a variety of solutions.

A first solution known in the art may include re-training of an attacked classification model with additional data that has undergone adversarial manipulation. Such a solution may require a mechanism for identifying that an adversarial attack has indeed occurred and may be limited to a local solution based on the actual perturbation used in the adversarial example.

A second solution known in the art may include changing of specific aspects of the classifier model (e.g. introducing architectural changes) that may be known to encourage adversarial perturbations. For example, a classification model trained to recognize faces may be adapted to ignore specific facial features (e.g., skin color) in order to avoid obfuscation that may be based upon alteration of the ignored feature (e.g., slightly changing the skin color). Such a solution may be strongly dependent upon the training set, including specific adversarial examples, to correctly identify the required changes and may limit the capabilities of the classification model (e.g., by ignoring a feature that may have been used to differentiate between subjects).

A third solution known in the art may include pre-processing of the data input to the classifier. For example, a classifier that is adapted to perform object recognition may be introduced pre-processed input images (e.g., a filter such as a median filter, an affine transformation, and the like), so as to diminish adversarial perturbations to some degree and keep the original image intact. Such a solution may heavily rely on correct identification of the type and quantity of perturbation used in the adversarial example.

SUMMARY OF THE INVENTION

Embodiments of the invention may include a method for detecting an occurrence of an adversarial attack on a data classifier and protecting the classifier against the adversarial attack.

An embodiment may include applying an a-priori constraint on an input data element (e.g., an input image), as a preprocessing stage, and providing the constrained data as input to the classifier, as elaborated herein. This process may ensure that the classifier will receive, as input, data elements that do not include an adversarial perturbation and hence may not be obfuscated by an adversarial example.

Embodiments may further include comparing between a first output of the classifier, corresponding to an input data element (e.g., an input image) and a second output of the classifier, corresponding to the constrained data. This comparison may be utilized to detect whether the input data element (e.g., an input image) has been subject to alteration, such as an alteration included in an adversarial attack. For example, if the outcome of the comparison between the first output and second output is large, then embodiments of the invention may determine that the input data element may include an adversarial perturbation (e.g., has been altered by an attacker).

Embodiments of the invention may include utilizing an autoencoder process or module, to perform the a-priori constraint on the input data element (e.g., on the input image). The autoencoder may include a bottleneck layer adapted to reduce an intrinsic dimensionality of the input data element, to produce a representation of the input data element in a restricted data space, so as to exclude adversarial perturbations, as elaborated herein.

Embodiments of the invention may include a method of detection of adversarial attacks against a classifier. The method may include: using a classifier that may be adapted to classify data elements of a specific category; receiving a first data element; applying the classifier on the first data element, to produce a first classification of the data element; using an autoencoder to generate a reconstructed, second data element based on the first data element; applying the classifier on the second data element, to produce a second classification of the data element; and analyzing the first and second classifications to detect an adversarial attack on the classifier.

Detection of an adversarial attack on the classifier may include, according to some embodiments, comparing the first and second classifications to determine whether the first and second data elements are classified differently by the classifier.

Embodiments of the method may include producing an indication that an adversarial attack on the classifier has been detected. For example, an administrative user may receive such a notification (e.g., via an email message), and may consequently constrain data transfer from a suspected origin computing device of the adversarial attack.

The classifier may be adapted to produce a classification of data elements of the specific category as output vectors. Embodiments of the method may include analyzing the first and second classifications by applying a comparator ML model on the respective output vectors, to determine whether the first and second data elements are classified differently by the classifier.

Embodiments of the method may include a method of protection against adversarial attacks on a classifier (e.g., a classifier images of real-world objects). The method may include: receiving a first data element (e.g., an image of a real-world object) pertaining to a specific category (data structures of images); using an autoencoder to generate a reconstructed, second data element based on the first data element; applying a classifier, adapted to classify data elements of the specific category on the second data element, to produce a classification of the second data element; and utilizing the classification of the second data element by a host device (e.g., an application adapted to receive, and act upon the outcome of the classification).

The autoencoder may be implemented as a neural network (NN). The NN may include an input layer, an output layer and a bottleneck layer. Each layer may include one or more neural nodes, and the bottleneck layer may have a smaller dimensionality than the input layer and output layer (e.g., may include less neural nodes than the input layer and output layer).

In some embodiments, the autoencoder's NN may include one or more hidden layers.

In some embodiments, the autoencoder's NN may include activation function neural nodes, transfer function neural nodes and/or subsampling operations' neural nodes, as known in the art.

In some embodiments, the autoencoder's NN may include convolutional layers, as known in the art.

Embodiments of the method may include training the autoencoder to: receive a first data element including at least one adversarial data perturbation; and reconstruct the first data element to produce a second data element that may be devoid of the at least one adversarial data perturbation.

According to some embodiments, the classifier may be a supervised classification Neural-Network (NN) model, and embodiments of the method may include: applying the classification NN model on a training set including a plurality of training data elements that may be devoid of adversarial perturbations; recording at least one first value of one or more nodes in one or more layers of the classification NN model in response to the application of one or more training data elements; training an autoencoder module on the recorded at least one first value of the one or more nodes, to generate at least one reproduced, second value of the one or more nodes; and replacing the at least one first value of the one or more nodes in the classification NN model with the at least one reproduced, second value of the one or more nodes.

According to some embodiments, the received first data element may be a data structure that may represent an image and the specific, respective category may be a category of identifiable objects. The classifier may be adapted to identify at least one object in an image and classify the image according to the category of identifiable objects. The category of identifiable objects may be selected from a list including, for example, human-beings, faces, animals, traffic signs and vehicles.

According to some embodiments, the received first data element may be a data structure that may represent an audio data element and the specific, respective category may be audio that may belong to a specific person. The classifier may be adapted to identify at least one audio data element and classify the audio data element according to the specific person.

According to some embodiments, the received first data element may be a data structure that may represent a video data element and the classifier may be adapted to identify at least one video data element (e.g., to identify a specific video from a group of video data elements, to identify unauthorized copy of a right-protected video).

Embodiments of the present invention may include a system for detection of adversarial attacks against a classifier. The system may include a non-transitory memory device, where modules of instruction code are stored, and at least one processor associated with the memory device, and configured to execute the modules of instruction code. Upon execution of the modules of instruction code, the at least one processor may be further configured to perform at least one embodiment of a method of protection and/or detection of adversarial attacks against a data classifier, as elaborated herein.

For example, the at least one processor may be configured to: receive a first data element pertaining to a specific category; use an autoencoder, to generate a reconstructed, second data element based on the first data element; apply a classifier, adapted to classify data elements of the specific category on the second data element, to produce a classification of the second data element; and utilize the classification of the second data element by a host device.

Additionally, or alternatively, the at least one processor may be configured to train the autoencoder to: receive a first data element pertaining to the specific category and comprising at least one adversarial data perturbation; and reconstruct the first data element to produce a second data element that pertains to the specific category and is devoid of the at least one adversarial data perturbation.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a block diagram depicting a schematic example of an autoencoder module 20, which may be included within a system for detection and/or prevention of adversarial attacks against a classifier, according to some embodiments of the invention;

FIG. 4A and FIG. 4B are schematic diagrams depicting an example of a Neural-Network (NN) based implementation of a classification model, that may be included in a system for detection and/or prevention of adversarial attacks against a classifier, according to some embodiments of the invention;

Figure 1:
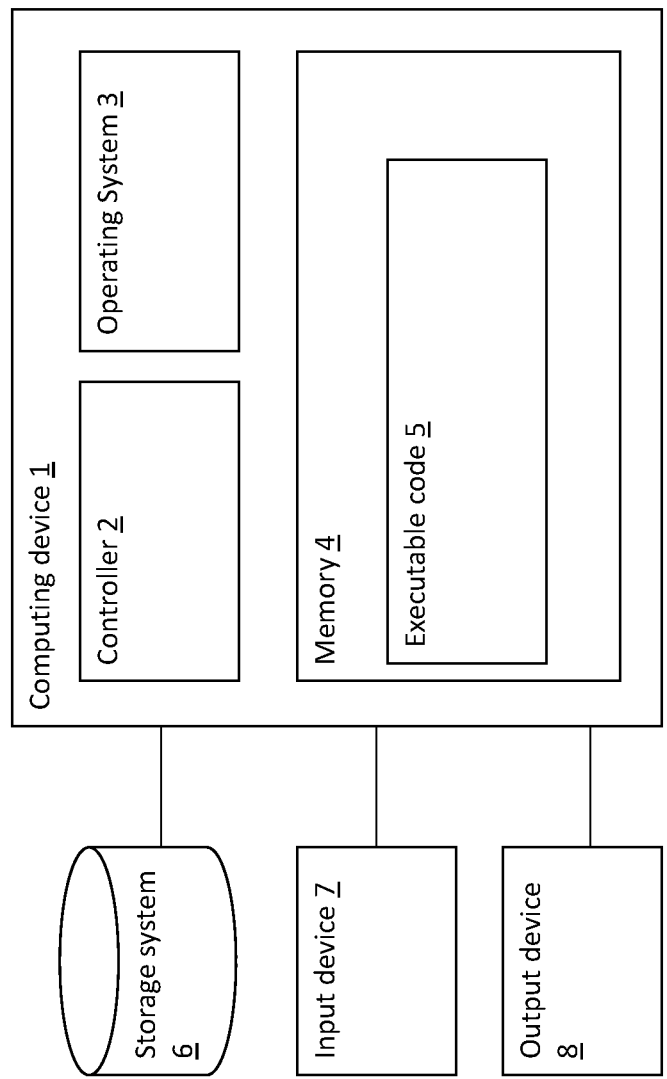
FIG. 1 is a block diagram, depicting a computing device which may be included in a system for detection of adversarial attacks against a classifier according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may include a method and a system for detection and/or prevention of adversarial attacks against a classifier.

Reference is now made to FIG. 1, which is a block diagram depicting a computing device, which may be included within a system for detection and/or prevention of adversarial attacks against a classifier, according to some embodiments of the invention.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that may detect adversarial attacks against a classifier, as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein. Executable code 5 may include modules used to execute neural networks or ML models which in some embodiments use simulated or virtual neurons or nodes.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
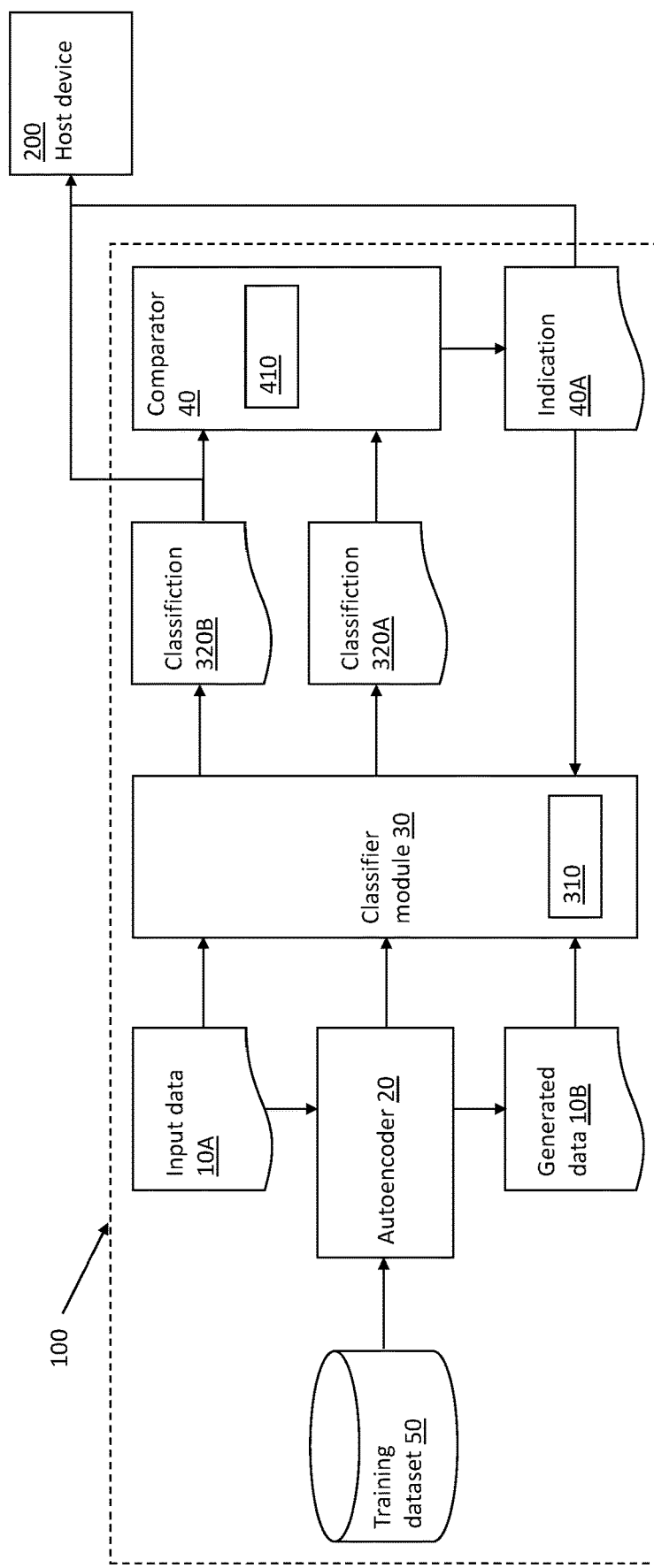
FIG. 2 is a block diagram, depicting a system for detection and/or prevention of adversarial attacks against a classifier according to some embodiments of the invention.

Reference is now made to FIG. 2, which depicts a system for detection and/or prevention of adversarial attacks against a classifier, according to some embodiments of the invention. As shown in FIG. 2, system 100 may include at least one of: a classifier module 30, an autoencoder module 20 and a comparator module 40. Each of modules 20, 30 and 40 may include or may be implemented as a software module, as a hardware module or any combination thereof. For example, each of modules 20, 30 and 40 may include or may be implemented as a software process and may be executed by at least one processor (e.g. element 2 of FIG. 1) included in a computing device (e.g., element 1 of FIG. 1).

Classifier module 30 may be adapted to classify, or produce a classification (e.g., a labeling or association of a data element to a group or class of data elements) 320 (e.g., 320A, 320B) of input data elements of a specific category, as known in the art. For example, classifier module 30 may include or may be implemented as a Machine Learning (ML) based classification model, trained to classify and/or identify data elements of a specific category. For example, an input voice stream may be classified or labelled with the name of the person determined to be speaking.

The term classification may be used herein to refer to an output of classifier module 30. For example, a data element may be a data structure (e.g., a matrix, a list and the like) that may describe or correspond to an image of an object. The data element may, for example, be included in file (e.g., an image file), or in a data stream. A classification 320 may be a definitive identification, by classifier module 30, of the data element (e.g., the image of the object) as corresponding to a real-world element (e.g., the real-world object).

In another example, a data element may be a data structure (e.g., a vector) that may describe or correspond to a recorded sound. The data element may, for example, be included in file (e.g., an audio file), or in a data stream. A classification 320 may be a definitive identification, by classifier module 30, of the data element (e.g., the recorded sound) as associated with a real-world sound, such as a speech of a specific person.

In another example, a classification 320 may be an indication, by classifier module 30 that a data element (e.g., a blurred image) does not correspond to any real-world element (e.g., classified as noise).

The category of data elements may, for example, be images of real-world, identifiable objects and the one or more input data elements 10A may be one or more data elements pertaining to the category of images of real-world, identifiable objects (e.g., data structures that are or that represent one or more images of real-world elements, such as road signs). Classifier module 30 may be or may include an ML-based object recognition model that may be trained or adapted to identify at least one data element 10A (e.g., an image of a road sign) as including at least one identifiable object (e.g., a specific type of road sign, such as a stop sign).

For example, classifier module 30 may be implemented as a rule-based classifier, adapted to classify an input data element 10A according to one or more components or features of input data element 10A. The rules may, for example, be implemented as a table that may include one or more entries, where each entry may attribute or associate a class membership to a data element according to one or more features of the data element, as known in the art.

In another example, classifier module 30 may include an ML model that may be implemented as a trained neural network (NN), including neural nodes. The neural nodes may typically be implemented as virtual, software-based entities, as known in the art. Embodiments of the present invention may include an improvement over prior art in the functionality of NN-based classifiers, as elaborated herein (e.g., in relation to FIG. 4B).

Classifier 30 may classify the data element 10A (e.g., the image of the stop sign, an audio recording of a voice) according to the respective category (e.g., the category of images of real-world, identifiable objects, the category of the identity of speakers, the category of the content of human speech, etc.). In some embodiments, the category of identifiable objects may be selected from a list that may include one or more of: images of human-beings, images of faces, images of animals, images of traffic signs and images of vehicles.

In another example, the category may be of audio data (e.g., audio belonging to or associated with one or more specific people) and the one or more input data elements 10A may be one or more data structures that may be or may represent audio data elements (e.g., audio files and/or audio streams), such as recorded speech files. Classifier module 30 may be or may include an ML-based speech recognition model that may be adapted or trained to identify and/or categorize the one or more input data elements 10A (e.g., one or more words that may be included within the one or more audio files) according to, or as belonging to the one or more specific person.

In another example, the category may be of video data and the one or more input data elements 10A may be a data structure representing a video data element (e.g., a video file and/or stream). Classifier 30 may be trained or adapted to identify the at least one video data element (e.g., determine that a first video file that may be stored on a first computing device, such as element 1 of FIG. 1 is a copy of a second video file that may be stored on a second computing device, as in a case of copyright infringement).

System 100 may receive an input data element 10A (e.g., an image) pertaining to the specific category. Pertaining to the object recognition example, system 100 may receive as input 10A, from an input device 7 of FIG. 1 (e.g., a camera) an image of a real-world element (e.g., a stop sign).

As explained above, received data element 10A may or may not include an adversary data perturbation, adapted to obfuscate classifier module 30, so as to produce an erroneous categorization of data element 10A.

For example, in a system configured to perform face recognition, an image of a first person's face may be altered (e.g., by changing a location of an eye in the image, etc.) so as to 'fool' classifier module 30 that may be adapted to perform face recognition into classifying or identifying the first person's face as that of a second person.

In another example, in a system configured to object recognition, an image of a first object may be altered (e.g., by adding pixelated noise to the image) so as to 'fool' classifier module 30 that may be adapted to perform object recognition into classifying or identifying the first object as a second object.

According to some embodiments of the invention, autoencoder 20 may receive input data element 10A, apply a constraint or other modification on input data element 10A and generate a second data element 10B that may be a constrained representation of input data element 10A. Data element 10B may be a constrained representation of input data element 10A in the sense that it may include a subset, but not all, of the information that is included in input data element 10A.

Reference is now made to FIG. 3, which is a block diagram depicting a schematic example of an autoencoder module 20, which may be included within a system for detection and/or prevention of adversarial attacks against a classifier, according to some embodiments of the invention. While in some embodiments an autoencoder module or a NN module may be used to modify input data to produce a modified data element for comparison, in other embodiments a modification may be performed without an autoencoder module or NN module.

As known in the art, autoencoder module 20 may be a type of artificial NN that may be used to learn a representation or an encoding for an input data element. The representation may typically include a reduction of an inherent dimensionality of input data element 10A. Along with the reduction of dimensionality, autoencoder module 20 may be adapted to reconstruct or generate a reconstructed data element 10B of input data element 10A, from the reduced encoding.

Autoencoder 20 may include an encoder 21, that may be adapted to receive as input at least one data element (e.g., an image) in a first dimensionality (e.g., the number of pixels in the image). Encoder 21 may be adapted to compress, or reduce the dimensionality of the input data element, to obtain a compressed representation of the input data.

Autoencoder 20 may further include a decoder, adapted to generate, as an output, a reconstructed representation of the input data element.

As shown in FIG. 3, autoencoder 20 may be implemented as a NN, and may include for example: an input layer of neural nodes 20A, that may be included in encoder 21; a bottleneck layer 20B that may manifest the compressed representation of the input data, and may connect between encoder 21 and decoder 22; and an output layer 20C, that may generate a reconstructed a representation of the input data element, as known in the art.

In some embodiments, bottleneck layer 20B may be smaller (e.g., have fewer neural nodes) than input layer 20A and smaller than output layer 20C.

It is to be noted that as FIG. 3 is a schematic diagram, edges connecting different neural nodes of the autoencoder module 20 NN have been omitted from the diagram for the purpose of clarity.

According to some embodiments of the invention, autoencoder module 20 may be configured to receive an input data element 10A and may be trained to generate a reconstructed data element 10B. For example, autoencoder module 20 may receive, as part of a training process, a training dataset (e.g., element 50 of FIG. 2) that may include data elements that are devoid of adversarial perturbations. Autoencoder module 20 may be trained on the training data set, by any appropriate supervised training algorithm known in the art, to generate a reconstructed data element.

As known in the art, autoencoder module 20 may be trained to minimize a cumulative loss function of the reconstructed data element over the training set.

According to some embodiments, an example cumulative loss function may be implemented as in equation 1a or 1b, below:

$$\text{Cumulative loss}=\Sigma_i |D_u(E_w(I_i))-I_i| \quad \text{Equation 1a:}$$

$$\text{Cumulative loss}=\Sigma_i |D_u(E_w(I_i))-I_i|^2 \quad \text{Equation 1a:}$$

where:

$I_i$ may represent an i-th input data element (e.g., input data element 10A) of training dataset I (e.g., element 50 of FIG. 2);

$E_w(\bullet)$ may represent a w-dimensioned output of encoder 21 (e.g., a compressed representation of input data element 10A); and $Du(\bullet)$ may represent a w-dimensioned output (e.g., reconstructed data element 10B) of decoder 22.

According to some embodiments, the cumulative loss function may include a loss metric that may be different than the square difference metric of equation 2. For example, an example cumulative loss function may be implemented as in equation 2, below:

$$\text{Cumulative loss}=\Sigma[F_1(D_u(E_w(I_i)),I_i)] \quad \text{Equation 2:}$$

where $F_1(\bullet)$ represents a difference function that may be dependent upon the input data category. For example, in the case of a data input category that is an image, difference function $F_1(\bullet)$ may be any function for comparing two images as known in the art, such as a Structural Similarity (SSIM) function.

According to some embodiments, the cumulative loss function may include a term that may retain the output of classifier module 30 with and without the autoencoder. In other words, autoencoder 20 may be trained to produce or generate, from an input data element 10A, a reconstructed data element 10B, where both data elements 10A and 10B would be similarly classified by classifier module 30

For example, an example cumulative loss function may be implemented as in equation 3, below:

$$\text{Cumulative loss}=\Sigma_i[F_1(D_u(E_w(I_i)),I_i)+F_2(C(D_u(E_w(I_i)),C(I_i)))] \quad \text{Equation 3:}$$

where:

$C(\bullet)$ may represent the output of the classifier module 30; and $F_2(\cdot)$ may represent a difference function, between the output of classifier module 30 in view of input data $I_i$ (e.g., input data element 10A), and the output of classifier module 30 in view of reconstructed data 10B (e.g., manifested in Eq. 3 as $D_u$ ($E_w(I_i)$)).

According to some embodiments, autoencoder 20 may be presented, as part of the training process, one or more data input elements that may be labeled adversarial examples. For example, autoencoder 20 may receive a first input data element $I_i$ (e.g., a sampled voice recording of a human user) and a second input data element $I_j$ that may have undergone an alteration (e.g., an adversary alteration). The corresponding loss function may consequently be implemented as in equation 4, below:

$$\text{Cumulative loss} = \Sigma_i[F_1(D_u(E_w(A(I_i))), A(I_i)) + F_2(C(D_u(E_w(A(I_i))), C(A(I_i))))] \quad \text{Equation 4:}$$

where: $A(I_i)$ may represent an adversary alteration function that may or may not have been applied on incoming data element $I_i$.

In some embodiments, autoencoder module's 20 output (e.g., at least one reconstructed data element) may be validated with labeled adversarial examples. For example, the adversarial examples (e.g., data elements such as images that may include at least one adversarial perturbation) may be labeled as pertinent to a specific class of data elements (e.g., image of a specific object), and autoencoder module's 20 may fine-tune its training by any type of supervised validation process known in the art, based on the labels of adversarial examples.

Pertaining to the example of the object recognition system, an input data element 10A may be a real-world image of a real-world object and generated data element 10B may be a reconstructed graphic representation of data element 10A. Input layer 20A may include a first number of neural nodes that may correspond with a high dimensionality of input data element 10A (e.g., the real-world image). For example, the first number of nodes may correspond with (e.g., may be equal to) the number of pixels in image 10A. Output layer 20C may be smaller than input layer 20A and may include a second a number of pixels that may correspond with (e.g., may be equal to) the number of pixels in reconstructed, generated image 10B. Bottleneck layer 20B may include a third number of neural nodes, that may be correspond to the reduced dimensionality of data element 10A, as known in the art.

As the intrinsic dimensionality of input data element 10A is reduced by bottleneck layer 20B, the generated, reconstructed data element 10B may be a representation of input data element 10A in a data space that is constrained by the reduced dimensionality and may be devoid of adversarial perturbations.

In other words, autoencoder 20 may receive input data element 10A that may include at least one adversarial data perturbation. Autoencoder 20 may reconstruct input data element 10A, to produce a generated data element 10B. Through the reduction of dimensionality, autoencoder 20 may be constrained to generate data element 10B that is a reconstruction of input data element 10A, where the reconstructed data element 10B is devoid of the at least one adversarial data perturbation.

Referring back to FIG. 2, in some embodiments, classifier 30 may apply classification to the generated, reconstructed data element 10B that may be devoid of adversarial perturbations.

In other words, classifier 30 may produce an output (e.g., a classification 320B) of the generated, reconstructed data element 10B (e.g., an object) within the respective category (e.g., a category of images of real-world objects), in an environment that may be protected or isolated from adversarial examples. Embodiments of the invention may thus prevent or defuse adversarial attacks against classifier module 30.

In some embodiments, classifier 30 may be included in or associated with a host device 200, that may utilize classifier 30. Host device 200 may be or may include at least one computing device (e.g., element 1 of FIG. 1).

For example, host device (or computing device) 200 may be or may include a processor (e.g., element 2 of FIG. 1) that may be included in a navigational system of an autonomous vehicle, and classifier 30 may be trained to identify and classify road signs according to input data elements 10A that are digital images.

According to some embodiments, system 100 may protect host device 200 from adversarial attacks that may target classifier 30 by having host device utilizing classification 320B of the generated, reconstructed data element 10B (e.g., rather that the 'original' classification 320A of input data element 10A that may include an adversarial perturbation or modification).

In some embodiments, classifier 30 may apply classification to input data element 10A to produce a second output (e.g., a second classification 320B) of the data element (e.g., an object in an image) within the category (e.g., a category of images of real-world objects).

System 100 may include a comparator module 40, configured to analyze or compare the first output and second output (e.g., the first classification 320A and second classification 320B), so as to detect an adversarial attack on classifier 30.

For example, classifier module 30 may be or may include an artificial NN that may implement an ML-based classification model, trained to perform object identification (e.g., identify an animal) from an input image, as known in the art. Classifier module 30 may include an output layer of neural nodes, that may serve as a binary output vector, for example, a first identified object (e.g., a dog) may produce a first binary output vector (e.g., 00001) and a second identified object (e.g., a cat) may produce a second binary output vector (e.g., 00010). An input data element (e.g., an image of a dog) may have been subject to an adversarial attack, so as to be classified by classifier model 30 as a second data element (e.g., a cat). Autoencoder 20 may receive input data element 10A and generate a reconstructed data element 10B of data element 10A (e.g., a reconstruction of the image of the dog). Classifier module 30 may produce a first classification 320A (e.g., output vector 00001) in response to input data element 10A and produce a second classification 320B (e.g., output vector 00010) in response to the generated reconstruction data element 10B.

According to some embodiments of the invention, comparator module 40 may compare the first classification 320A and second classification 320B (e.g., the first and second output vectors), determine whether the first and second data elements are classified differently by classifier 30, and accordingly detect or determine whether or not an adversarial attack on classifier 30 has taken place.

For example, when classification 320A and classification 320B are different, comparator module 40 may determine that an adversarial attack has occurred, and when classification 320A and classification 320B are equivalent (e.g., equal or substantially equal), comparator module 40 may determine that an adversarial attack has not occurred on input data element 10A. Pertaining to the example of animals, if an original data element 10A is an image of a dog, and classifier module 30 is subject to an adversarial attack, then classification 320A may be a first binary vector (e.g., '00001', erroneously representing a cat), whereas classification 320B (e.g., of the regenerated image) may be a second binary vector (e.g., '00010', correctly representing a dog).

Additionally, or alternatively, classifier 30 may be adapted to produce a classification 320 (e.g., 320A, 320B) of data elements of the specific category as output vectors that may not be binary. For example, classifier 30 may emit an output vector that may correspond with a probability of a specific classification.

Pertaining to the example of the animals: a first classification output 320A (e.g., in response to input data element 10A) may yield a first output vector (e.g., 0.3, 0, 0, 0.1, 0.6), respectively corresponding with different probabilities of classification per each object (e.g., 30% for a fish, 10% for a cat and 60% for a dog); and a second classification output 320B (e.g., in response to reconstructed data element 10B) may yield a second output vector (e.g., 0.25, 0.35, 0, 0, 0.4) respectively corresponding with different probabilities of classification per each object (e.g., 25% for a fish, 35% for a snake and 40% for a dog).

According to some embodiments, comparator module 40 may include a machine learning (ML) based comparator model 410, adapted to analyze the output vectors, so as to determine whether or not a first data element (e.g., input data element 10A) and second data element (generated reconstruction data element 10B) are classified differently by classifier 30, and subsequently determine whether or not an adversarial attack has taken place.

Pertaining to the same example of animals, comparator ML model 410 may determine that the first classification 320A corresponds with an image of a dog, and the second classification 320B corresponds with an image of a snake (e.g. due to the higher accumulated probability of the scaled animals in relation to the furry ones). Comparator module 40 may determine that the first and second data elements are classified differently by the classifier (e.g., snake vs. dog), and subsequently deduce that an adversarial attack has occurred.

In some embodiments of the invention, comparator module 40 may be configured to produce an indication 40A that an adversarial attack on classifier 30 has been detected. Indication 40A may be or may include at least one of first classification 320A and second classification 320B.

For example, classification module 30 may be employed by an organizational security system (e.g., a security server included in a bank), and may be adapted to identify a user (e.g., via an ML-based facial recognition algorithm, as known in the art). Classification module 30 may be presented with an original input 10A such as an image of a first user and may be subject to an adversarial attack. Classification module 30 may produce an erroneous first classification 320A (e.g., erroneously representing a second user). Classification module 30 may be presented with a second, reconstructed data element 10B and may produce a correct, second classification 320B (e.g., correctly representing the first user).

Comparator module 40 may identify a difference in the output of classifier 30 between the first, erroneous classification 320A (e.g., identity of the second user) of a first image of a face that may be or may be included in compromised input data element 10A; and a second, correct classification 320B (e.g., identity of the first user) of a second image of a face that may be or may be included in reconstructed data element 10B.

Comparator module 40 may consequently determine that an adversarial attack against classifier 30 has occurred and produce a respective warning indication 40A (such as an email message to a computing device of a responsible administrator). Warning indication 40A may include at least one of the first and second classifications 320 (e.g., the identities of the first and second users), for the administrator's discretion and further handling.

Figure 4B:
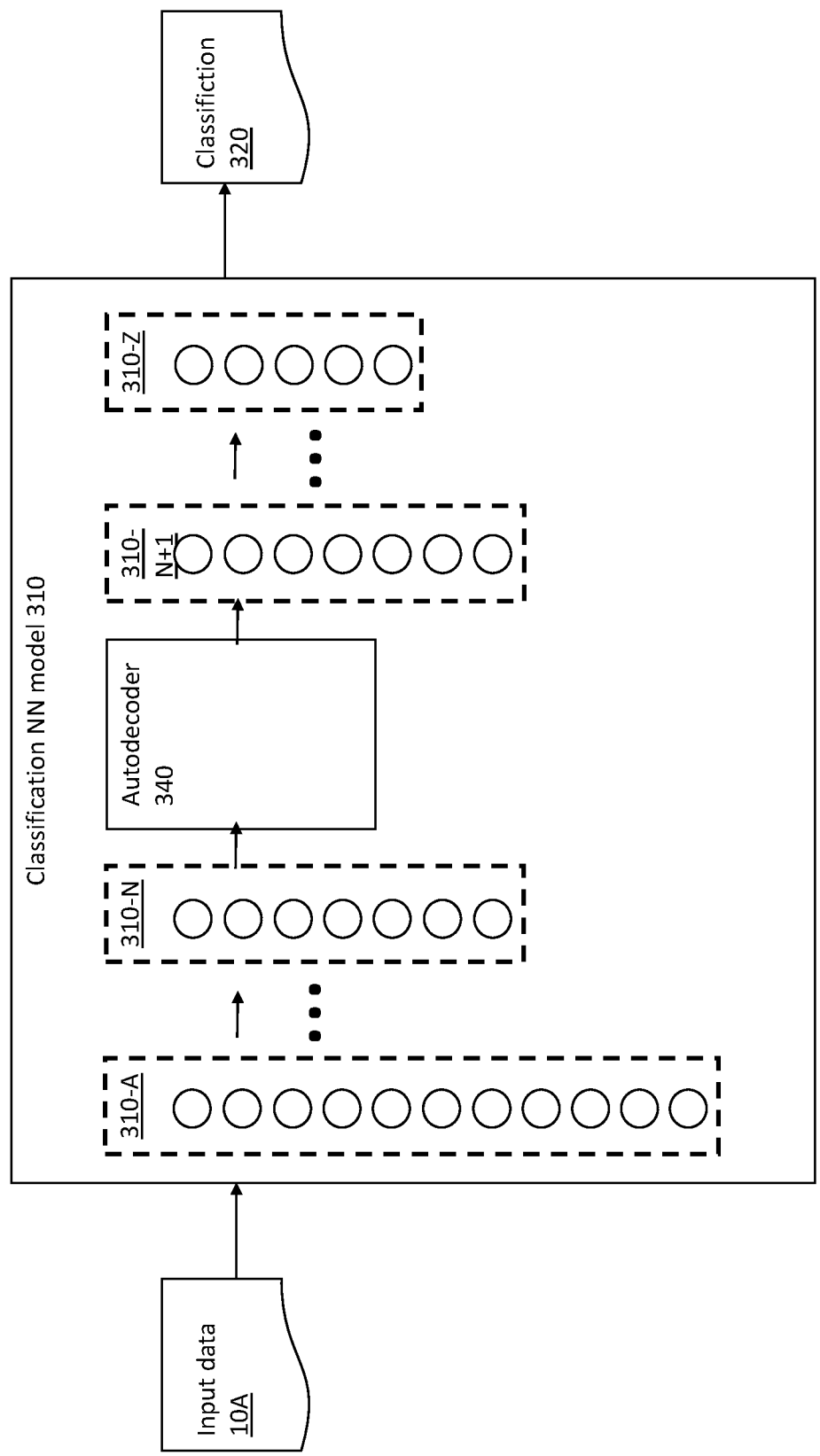

Reference is now made to FIG. 4A and FIG. 4B which are schematic diagrams depicting an example of a neural network (NN) based implementation of a classification model 310, that may be included in a system for detection and/or prevention of adversarial attacks against a classifier 30, according to some embodiments of the invention.

As described herein, a classifier (e.g., classifier module 30 of FIG. 2) may include or may be a NN-based classification model 310. As known in the art, classification model 310 may be trained by a training set (e.g., element 50 of FIG. 2) to classify one or more data elements (e.g., element 10A of FIG. 2) pertaining to a specific category.

For example, as shown in FIG. 4A, NN model 310 may include a plurality of neural node layers (e.g., 310-A through 310-Z). As known in the art, each neural node layer may include one or more neural nodes, schematically marked as circles. As FIG. 4A and FIG. 4B are schematic diagrams, the arches connecting between neural nodes of each neural layer have been omitted, for the purpose of clarity. NN model 310 may be trained to receive data elements 10A (e.g., real-world images), and classify the input data elements 10A (e.g., according to real-world objects that may be included therein). NN model 310 may then produce a classification 320 of at least one input data element 10A (e.g., an image of an object beyond the training set) according to the training.

Embodiments of the invention may include a method for fixing or substituting a portion of NN model 310 after training by an autoencoder, so as to filter-out adversary elements (e.g., perturbations or adjustments) that may be included (e.g., by a perpetrator of an adversarial attack) within at least one input data element 10A.

According to some embodiments, during a training period, classification NN model may be applied on a training set (e.g., element 50 of FIG. 2) including a plurality of training data elements that may be devoid of adversarial elements (e.g., perturbations or adjustments).

Classifier 30 may be configured to record or store (e.g., on storage element 6 of FIG. 1) at least one first value of one or more nodes in one or more layers of the classification NN model in response to the application of one or more training data elements. For example, classifier 30 may maintain a database, including at least one table that may associate an identifier (e.g., a serial number) of at least one training data element with at least one respective value of one or more nodes in a layer (e.g., layer 310-N) of the classification NN model.

The term 'value' may be used herein, in the context of neural nodes, to refer to an inherent property of neural nodes, as known in the art. For example, the value of a neural node of a neural node layer may be a weighted sum of outputs of preceding nodes (e.g., nodes of a preceding layer). In some embodiments the neural node value may relate to a weighted sum of outputs of preceding nodes after applying an activation function such as a rectified linear units (ReLU) function, as known in the art.

As schematically shown in FIG. 4B, classification NN model 310 may include or may be associated with an autoencoder 340.

As explained in relation to FIG. 3, an autoencoder (e.g., element 20 of FIG. 3) may be trained to receive at least one data element (e.g., element 10A of FIG. 3) reduce a dimensionality of the data element (e.g., by bottleneck layer 20B of FIG. 3) and generate a reproduced version of the data element (e.g., element 10B of FIG. 3). The reduction of dimensionality by the autoencoder may be utilized as a filter for adversarial examples, where an input data element 10A may include an adversarial perturbation, and the reproduced version 10B of the data element may be devoid of the adversarial perturbation.

The implementation example of FIG. 4B may manifest such a filtering benefit among layers of classification NN model 310: autoencoder module 340 may be trained on the recorded at least one first value of the one or more nodes (e.g., values of nodes of layer 310-N), to generate at least one reproduced, second value of the one or more nodes (e.g., reproduced values of nodes of layer 310-N). As in the example depicted in FIG. 3, the reduction of dimensionality by the autoencoder 340 may filter adversarial examples. In other words, the at least one reproduced, second value of the one or more nodes of layer 310-N may be devoid of adversarial elements (e.g., perturbations or adjustments).

As shown in FIG. 4B, classification model 310 may replace the at least one first value of the one or more nodes in the classification NN model with the at least one reproduced, second value of the one or more nodes. For example, autoencoder 340 may be included within classification model 310 so that the output of autoencoder 340 (e.g., reproduced values of nodes of layer 310-N) may be input into a consecutive neural layer (e.g., 310-(N+1)).

In other words, classification NN model 310 may be trained separately from autoencoder 340 (e.g., as shown in FIG. 4A) to classify input data elements 10A according to a specific respective category (e.g., images of real-world objects). Subsequently, autoencoder 340 may be trained separately from classification NN model 310, with values of neural nodes classification NN model 310 as input. During an operational stage (e.g., after the training process), the connection between one or more nodes of a neural node layer (e.g., 310–(N+1)) to one or more nodes of a preceding neural node layer (e.g., 310-N) may be bypassed through autoencoder 340 (e.g., as shown in FIG. 4B). This configuration may present a double improvement over state-of-the-art classifier: adversarial modifications or perturbations that may be included in input data elements 10A may be filtered-out (e.g., removed) due to the autoencoder's 340, reduction of dimensionality; and the association of autoencoder 340 with a hidden (e.g., an internal) neural node layer (e.g., 310-N), rather than with the input layer (e.g., 310-A) or with the input data element 10A (e.g., as shown in FIG. 2) may require diminished computational resources, as explained herein.

Figure 5:
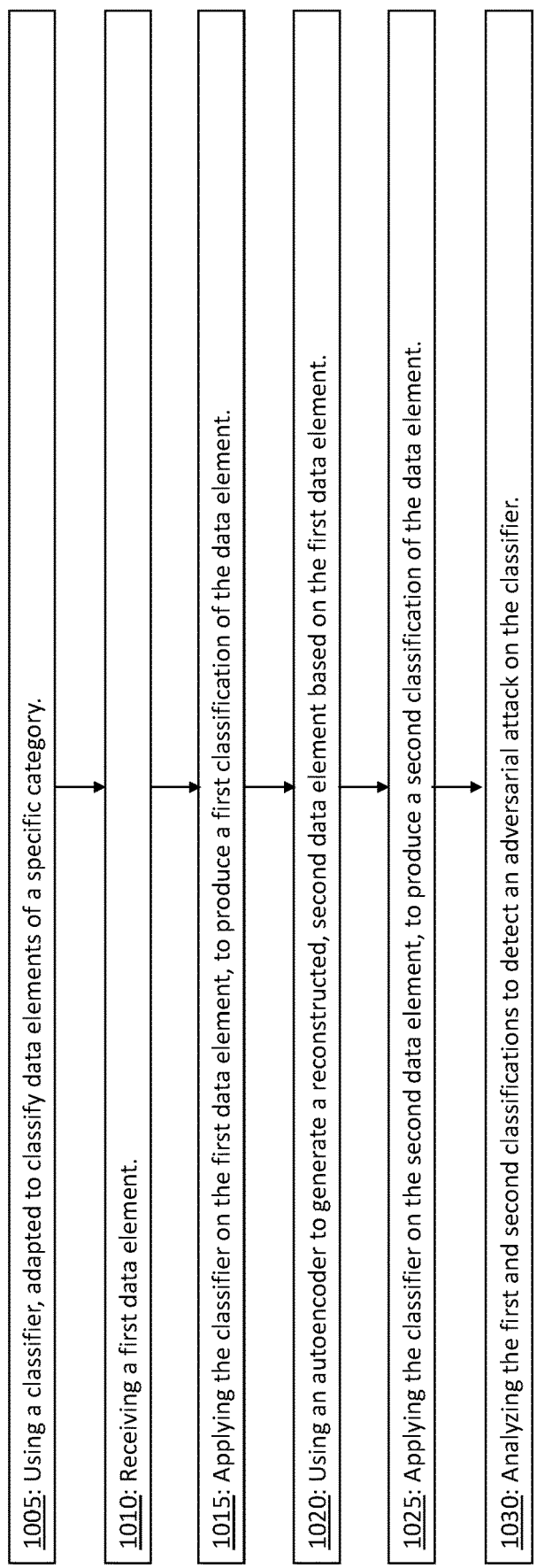
FIG. 5 is a flow diagram depicting a method of detection of adversarial attacks against a classifier, according to some embodiments of the invention.

Reference is now made to FIG. 5, which is a flow diagram depicting a method of detection of adversarial attacks against a classifier, according to some embodiments of the invention.

As shown in step 1005, embodiments of the method may include using a classifier (e.g., 30 of FIG. 2) that may be adapted to classify data elements of a specific category. For example, an autonomous vehicle's navigation system may require classification of objects that may appear on images that may be taken by a camera installed therein. The input data elements (e.g., 10A of FIG. 2) may include images including real-world elements, and the specific, respective data category may be a category of real-world images.

As shown in step 1010, embodiments of the method may include receiving a first data element. The first data element may or may not include at least one adversarial data perturbation or modification. Pertaining to the same example, the first data element may be an image of an object, such as a first traffic sign or post. The image may include a perturbation configured so as to obfuscate the classifier so as to recognize the first traffic sign as a second, different traffic sign.

As shown in step 1015, embodiments of the method may include applying the classifier on the first data element, to produce a first classification of the data element. Pertaining to the same example, if the first data element includes at least one adversarial data perturbation, the classifier may produce an erroneous classification (e.g., classify the first data element as the second traffic sign).

As shown in step 1020, embodiments of the method may include using an autoencoder (e.g., 20 of FIG. 2) to generate a reconstructed, second data element based on the first data element. Due to the inherent decreased dimensionality of autoencoder 20, the output of autoencoder 20 may be devoid of the at least one adversarial data perturbation or modification.

As shown in step 1025, embodiments of the method may include applying the classifier (e.g., 30 of FIG. 2) on the second data element (e.g., the reconstructed data element, output by autoencoder 20), to produce a second classification of the data element.

As shown in step 1030, embodiments of the method may include analyzing the first and second classifications (e.g., comparing between the classifications) to detect an adversarial attack on the classifier (e.g., by determining whether the first and second data elements are classified differently by the classifier.).

Figure 6:
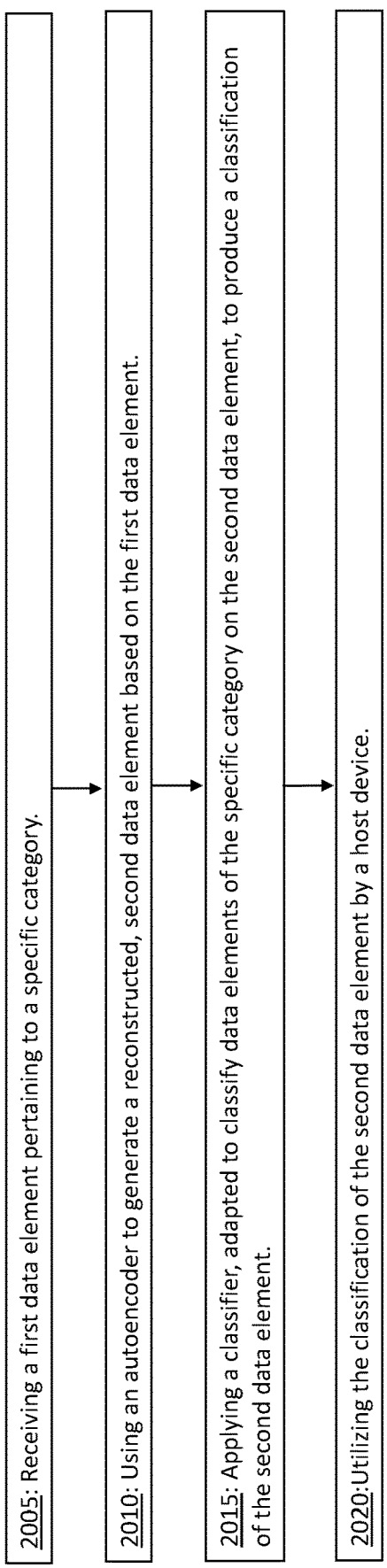
FIG. 6 is a flow diagram depicting a method of protection against adversarial attacks on a classifier, according to some embodiments of the invention.

Reference is now made to FIG. 6, which is a flow diagram depicting a method of protection against adversarial attacks on a classifier, according to some embodiments of the invention.

As shown in step 2005, embodiments of the method may include receiving a first data element (e.g., 10A of FIG. 2). The first data element may or may not include at least one adversarial data perturbation or modification. Pertaining to the same example, the first data element may be an image of an object, such as a first traffic sign or post. The image may include a perturbation configured so as to obfuscate the classifier so as to recognize the first traffic sign as a second, different traffic sign.

As shown in step 2010, embodiments of the method may include using an autoencoder (e.g., 20 of FIG. 2) to generate a reconstructed, second data element based on the first data element. Due to the inherent decreased dimensionality of autoencoder 20, the output of autoencoder 20 may be devoid of the at least one adversarial data perturbation or modification.

As shown in steps 2015 and 2020, embodiments of the method may include applying a classifier (e.g., 30 of FIG. 2), adapted to classify data elements of the specific category on the second data element, to produce a classification of the second data element and utilizing the classification of the second data element by a host device. Pertaining to the same example, the classifier may thus receive data elements that are devoid of adversarial perturbations and may be thus protected from adversarial attacks. The host (e.g., the autonomous vehicle's navigation system in this example) may thus safely utilize the classification provided by classifier 30.

Embodiments of the present invention may utilize inherent traits or characteristics of autoencoders, as known in the art to achieve a number of improvements over systems and methods of classification of data elements as known in the art.

For example, embodiments of the present invention may improve a security of a classifier-based system by utilizing an autoencoder's (e.g., element 20 of FIG. 2) inherent reduction of dimensionality to detect whether an adversarial attack has occurred on an input data element (e.g., 10A) that may be subject to classification by a classifier (e.g., element 30 of FIG. 2).

In another example, embodiments of the present invention may improve a workflow of a classifier-based system by filtering-out adversarial data elements (e.g., perturbations or adjustments) and presenting to the classifier only input data that is devoid of adversarial elements (e.g., perturbations or adjustments).

In yet another example, embodiments of the present invention may improve the functionality of an NN-based classifier by 'surgically' (e.g., with minimal addition of computing resources) rendering at least one neural node of at least one neural node layer devoid of adversarial attacks.

This 'surgical' enhancement of the NN-based classifier may be done by, for example: identifying a condition in which an adversarial attack has occurred (e.g., by comparator 40 of FIG. 2, as elaborated herein); identifying one or more nodes in a classification NN model (e.g., element 310 of FIG. 4B) of a classifier (e.g., element 30 of FIG. 2) that may exhibit substantially different (e.g., beyond a predefined threshold) node values in response to: (a) data element 10A (which including an adversarial perturbation) and (b) a reproduced version of 10A (e.g., 10B, which may be devoid of the adversarial perturbation); and including or integrating an autoencoder (e.g., element 340 of FIG. 4B) between hidden (e.g., internal) node layers (e.g., between 310-N and 310-(N+1)) of classification NN model, to replace the one or more neural node values.

As known in the art, hidden layers of the classification NN model may normally have a lower dimensionality (e.g., less neural nodes) than the input layer. For example, image classification applications may have an input layer dimensionality that may be in the order of the number of pixels in an image, whereas hidden layers may include processed data that that have much lower dimensionality. Therefore, including the autoencoder within the classification NN model may present a double benefit: filtering out adversarial perturbations and doing so with a minimal impact on computational resources.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of protection against adversarial attacks on a classifier, the method comprising:
receiving a first data element pertaining to a specific category, the first data element comprising at least one adversarial data perturbation;
applying the classifier, adapted to classify data elements of the specific category on the first data element, to produce a first classification;
using an autoencoder to generate a reconstructed, second data element based on the first data element, the second data element devoid of the at least one adversarial data perturbation; and
applying the classifier on the second data element, to produce a second classification;
comparing between the first classification and the second classification; and
determining, based on the comparison, that an adversarial attack has occurred when the first classification and the second classification are different, and determining that an adversarial attack has not occurred when the first classification and the second classification are equivalent.

2. The method according to claim 1, wherein the autoencoder is implemented as a Neural-Network (NN), comprising an input layer, an output layer and a bottleneck layer, each comprising one or more neural nodes and wherein the bottleneck layer comprises less neural nodes than the input layer and output layer.

3. The method according to claim 1, wherein the classifier is a supervised classification NN model.

4. The method according to claim 3, comprising:
applying the classification NN model on a training set comprising a plurality of training data elements that are devoid of adversarial perturbations;
recording at least one first value of one or more nodes in one or more layers of the classification NN model in response to the application of one or more training data elements;
training an autoencoder module on the recorded at least one first value of the one or more nodes, to generate at least one reproduced, second value of the one or more nodes; and
replacing the at least one first value of the one or more nodes in the classification NN model with the at least one reproduced, second value of the one or more nodes.

5. The method according to claim 1, wherein the received first data element is a data structure representing an image and wherein the specific category is a category of identifiable objects and wherein the classifier is adapted to identify at least one object in an image and classify the image according to the category of identifiable objects.

6. The method according to claim 5, wherein the category of identifiable objects is selected from a list comprising: human-beings, faces, animals, traffic signs and vehicles.

7. The method according to claim 1, wherein the received first data element is a data structure representing an audio data element and wherein the specific category is audio belonging to a specific person and wherein the classifier is adapted to identify at least one audio data element and classify the audio data element according to the specific person.

8. The method according to claim 1, wherein the received first data element is a data structure representing a video data element and wherein the classifier is adapted to identify at least one video data element.

9. A system for detection of adversarial attacks against a classifier, the system comprising: a non-transitory memory device, wherein modules of instruction code are stored, and at least one processor associated with the memory device, and configured to execute the modules of instruction code, whereupon execution of said modules of instruction code, the at least one processor is further configured to:

receive a first data element comprising at least one adversarial data perturbation;

apply the classifier on the first data element, to produce a first classification of the data element;

generate, by an autoencoder, a reconstructed, second data element based on the first data element, the second data element is devoid of the at least one adversarial data perturbation;

apply the classifier on the second data element, to produce a second classification of the data element;

compare, by a comparator, the first and second classifications; and determine, based on the comparison, that an adversarial attack has occurred when the first classification and the second classification are different, and that an adversarial attack has not occurred when the first classification and the second classification are equivalent.

10. The system according to claim 9, wherein the processor is configured to produce an indication that an adversarial attack on the classifier has been detected.

11. The system according to claim 10, wherein the classifier is a supervised classification NN model, and wherein the processor is configured to:

apply the classification NN model on a training set comprising a plurality of training data elements that are devoid of adversarial perturbations;

record at least one first value of one or more nodes in one or more layers of the classification NN model in response to the application of one or more training data elements;

train an autoencoder module on the recorded at least one first value of the one or more nodes, to generate at least one reproduced, second value of the one or more nodes; and replace the at least one first value of the one or more nodes in the classification NN model with the at least one reproduced, second value of the one or more nodes.

* * * * *